United States Patent
Tokudome

(10) Patent No.: US 11,480,006 B2
(45) Date of Patent: Oct. 25, 2022

(54) VEHICLE DOOR OPENING/CLOSING DEVICE

(71) Applicant: U-Shin Ltd., Tokyo (JP)

(72) Inventor: Tetsuo Tokudome, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 774 days.

(21) Appl. No.: 16/465,002

(22) PCT Filed: Oct. 6, 2017

(86) PCT No.: PCT/JP2017/036524
§ 371 (c)(1),
(2) Date: May 29, 2019

(87) PCT Pub. No.: WO2018/100886
PCT Pub. Date: Jun. 7, 2018

(65) Prior Publication Data
US 2019/0292838 A1    Sep. 26, 2019

(30) Foreign Application Priority Data

Nov. 30, 2016 (JP) .............................. JP2016-233217

(51) Int. Cl.
*E05F 15/73* (2015.01)
*E05F 15/40* (2015.01)
(Continued)

(52) U.S. Cl.
CPC ................ *E05F 15/73* (2015.01); *B60J 5/00* (2013.01); *B60J 5/04* (2013.01); *B60J 5/102* (2013.01);
(Continued)

(58) Field of Classification Search
CPC ..... E05F 15/73; E05F 15/74; E05F 2015/765; E05F 2015/763
See application file for complete search history.

(56) References Cited

U.S. PATENT DOCUMENTS

| | | | | |
|---|---|---|---|---|
| 5,142,152 A | * | 8/1992 | Boiucaner ............... | E05F 15/43 250/221 |
| 8,868,299 B2 | * | 10/2014 | Kroemke ................ | E05F 15/70 701/49 |

(Continued)

FOREIGN PATENT DOCUMENTS

| | | |
|---|---|---|
| DE | 100 64 141 | 6/2003 |
| DE | 10 2005 032 402 | 9/2006 |

(Continued)

OTHER PUBLICATIONS

Machine translation of DE102005032402B3.*
International Search Report dated Dec. 5, 2017 in International (PCT) Application No. PCT/JP2017/036524.

*Primary Examiner* — Marcus Menezes
(74) *Attorney, Agent, or Firm* — Wenderoth, Lind & Ponack, L.L.P.

(57) ABSTRACT

A vehicle door opening/closing device including a drive mechanism for driving the opening/closing of a door of a vehicle; a first detector and second detector for detecting the distance to an item to be detected which is positioned in a first detection range outside the vehicle or a second detection range which is closer than the first detection range; and a controller for controlling the drive mechanism, based on the detection results of the detectors. The controller prepares for the opening/closing of the door by the drive mechanism, by having the first and second detectors detect that an item to be detected has moved from the start area which is an area that overlaps the first detection range, to a trigger area which is an area that overlaps the second detection range, in the range of operation at a predetermined interval in the width direction of the vehicle.

8 Claims, 12 Drawing Sheets

(51) Int. Cl.
*E05F 15/77* (2015.01)
*B60J 5/10* (2006.01)
*B60J 5/00* (2006.01)
*E05F 15/611* (2015.01)
*B60J 5/04* (2006.01)

(52) U.S. Cl.
CPC ............ *E05F 15/40* (2015.01); *E05F 15/611* (2015.01); *E05F 15/77* (2015.01); *E05F 2015/765* (2015.01); *E05Y 2400/44* (2013.01); *E05Y 2600/46* (2013.01); *E05Y 2900/546* (2013.01)

(56) References Cited

U.S. PATENT DOCUMENTS

| | | | |
|---|---|---|---|
| 9,193,331 B2 * | 11/2015 | Endo | G07C 9/00309 |
| 9,834,175 B2 * | 12/2017 | Tokudome | B60R 25/2036 |
| 9,919,678 B2 * | 3/2018 | Mönig | B60R 25/24 |
| 10,005,428 B2 * | 6/2018 | Sticherling | B60R 25/2045 |
| 10,174,542 B1 * | 1/2019 | Ramakrishnan | E05F 15/611 |
| 10,176,368 B1 * | 1/2019 | Ramakrishnan | B60Q 1/2669 |
| 10,407,024 B2 * | 9/2019 | Müller | B60Q 1/323 |
| 10,501,052 B2 * | 12/2019 | Schindler | G01S 17/08 |
| 2011/0056134 A1 | 3/2011 | Zacchio et al. | |
| 2013/0169408 A1 | 7/2013 | Endo | |
| 2015/0176323 A1 * | 6/2015 | Ebert | E05F 15/73 49/31 |
| 2015/0247352 A1 * | 9/2015 | Adams | E05F 15/76 701/2 |
| 2015/0291126 A1 * | 10/2015 | Nicholls | G07C 9/00309 701/49 |
| 2015/0300074 A1 * | 10/2015 | Ette | E05F 15/76 701/2 |
| 2017/0032599 A1 * | 2/2017 | Elie | G07C 9/32 |
| 2017/0113652 A1 | 4/2017 | Tokudome | |
| 2017/0174179 A1 * | 6/2017 | Schumacher | B60R 25/24 |
| 2019/0249480 A1 * | 8/2019 | Tokudome | B60Q 1/0023 |
| 2019/0292838 A1 * | 9/2019 | Tokudome | E05F 15/73 |
| 2020/0056417 A1 * | 2/2020 | Lee | E05F 1/1091 |
| 2020/0340286 A1 * | 10/2020 | Tokudome | E05F 15/73 |
| 2021/0214991 A1 * | 7/2021 | Cruz | E05F 15/73 |

FOREIGN PATENT DOCUMENTS

| | | | | |
|---|---|---|---|---|
| DE | 102005032402 B3 * | 9/2006 | | B60Q 1/0023 |
| DE | 102017103443 A1 * | 8/2017 | | B60C 9/00 |
| DE | 102016209992 B4 * | 9/2020 | | E05F 15/73 |
| JP | 2011-521133 | 7/2011 | | |
| JP | 2014-221982 | 11/2014 | | |
| JP | 5643129 | 12/2014 | | |
| JP | 2017-82390 | 5/2017 | | |
| WO | WO-2008023973 A1 * | 2/2008 | | E05F 15/73 |
| WO | WO-2013182466 A1 * | 12/2013 | | H03K 17/955 |
| WO | WO-2014064297 A1 * | 5/2014 | | B60R 25/2054 |
| WO | WO-2014102178 A1 * | 7/2014 | | B60R 25/245 |
| WO | WO-2014199235 A2 * | 12/2014 | | B60R 25/01 |
| WO | WO-2020002033 A1 * | 1/2020 | | B62D 33/0273 |

* cited by examiner

VEHICLE DOOR OPENING/CLOSING DEVICE

This is a National Stage of International Application No. PCT/JP2017/036524 filed on Oct. 6, 2017, claiming priority from Japanese Patent Application No. 2016-233217 filed on Nov. 30, 2016, the disclosures of which are incorporated herein by reference in their entireties.

TECHNICAL FIELD

The present invention relates to a vehicle door opening/closing device.

BACKGROUND ART

As a vehicle door opening/closing device, there has been conventionally known a configuration that enables a rear seat door opening/closing drive unit to perform an operation for opening a rear seat door, when an obstacle is detected in a detection pattern that satisfies a plurality of predetermined conditions (see, for example, Japanese Unexamined Patent Application Publication No. 2014-221982).

PRIOR ART DOCUMENT

Patent Document

Patent Document 1: JP 2014-221982 A

SUMMARY OF THE INVENTION

Problems to be Solved by the Invention

Unfortunately, the abovementioned conventional vehicle door opening/closing device is difficult to use for a user due to the complicated detection pattern. The conventional vehicle door opening/closing device also has a problem that a back sonar for detecting the rear of the vehicle has a wide detection range and thus has difficulty in accurately detecting the movement of a user in a complex detection pattern.

In view of this, an object of the present invention is to provide a vehicle door opening/closing device capable of automatically opening and closing a door while accurately identifying the movement of the user despite a simple configuration.

Means for Solving the Problems

To address the above problems, the present invention provides a vehicle door opening/closing device including:
a drive means that opens/closes a door of a vehicle;
a first detection means and a second detection means that detect a distance to an object to be detected that is positioned within a first detection range outside the vehicle or a second detection range nearer than the first detection range; and
a control means that controls driving of the drive means for opening/closing the door based on detection results of the first detection means and the second detection means,
wherein the control means prepares for opening/closing of the door by the drive means, when the first detection means and the second detection means detect that the object to be detected has moved from a start area which is a region overlapping with the first detection range to a trigger area which is a region overlapping with the second detection range within an operation range having a predetermined width in a vehicle width direction.

With this configuration, even with a sensor that can detect only the distance to the object to be detected, the position of the object to be detected can be identified. Thus, despite a simple configuration, the movement of the object to be detected can be accurately identified, and door opening/closing control can be smoothly performed. In particular, the movement of the object to be detected can be accurately identified by setting an operation range which is limited to have a predetermined width in the vehicle width direction.

Effect of the Invention

According to the present invention, the detection means may be the one capable of detecting the distance to the object to be detected, and an existing back sonar, for example, can be used. Further, the detection range of the object to be detected can be limited by the two detection means, and thus, the movement of the user who is the object to be detected is accurately identified and the door can be automatically opened and closed, despite the simple configuration.

BRIEF DESCRIPTION OF THE DRAWINGS

The foregoing and the other feature of the present invention will become apparent from the following description and drawings of an illustrative embodiment of the invention in which.

MODE FOR CARRYING OUT THE INVENTION

An embodiment of the present invention will be described below with reference to the accompanying drawings.

Figure 1:
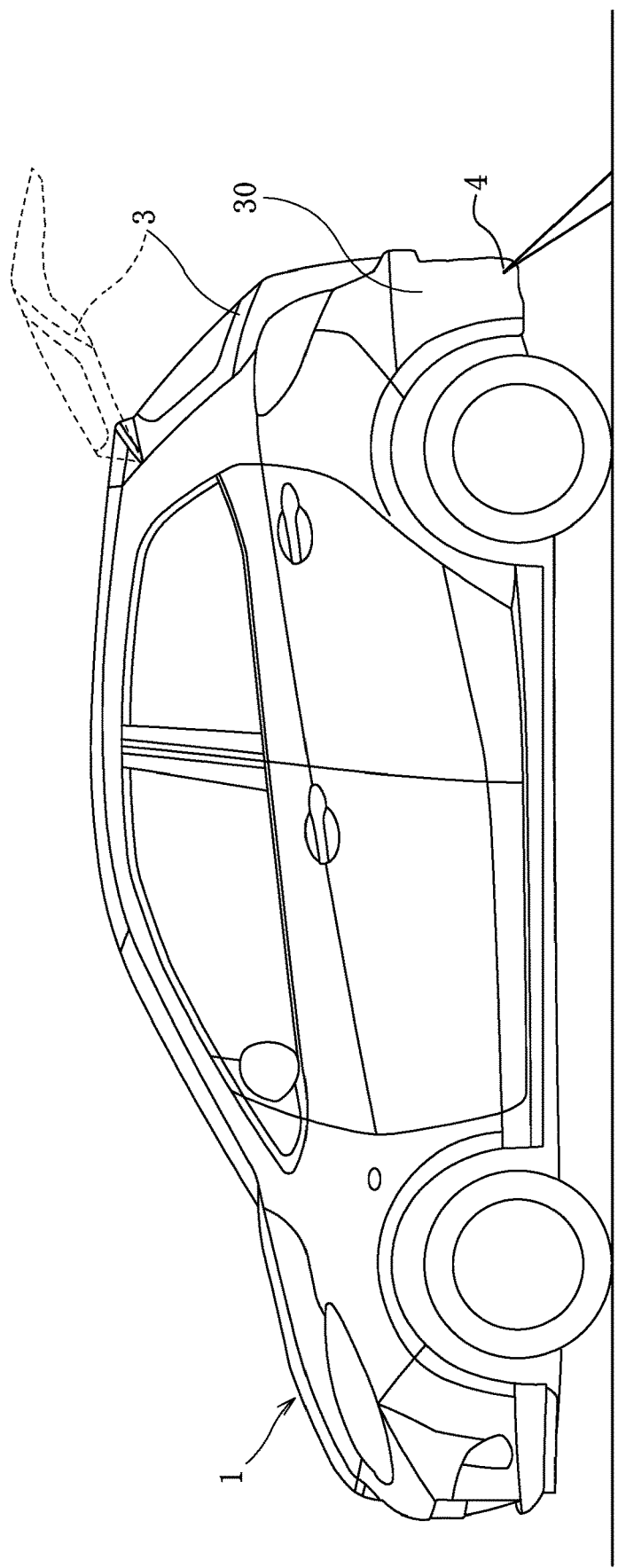
FIG. 1 is a side view of a vehicle.

FIG. 1 is a side view of a vehicle 1 provided with a door opening/closing device 2 according to the present embodiment. The door opening/closing device 2 is for automatically opening and closing a hatchback door (hereinafter simply referred to as a door 3) provided at the rear of the vehicle 1. That is, according to the door opening/closing device 2, a user can automatically open and close the door 3 without using hands if he/she performs a predetermined operation on the rear side of the door 3. The detail of the process for automatically opening and closing the door 3 will be described later.

Figure 2:
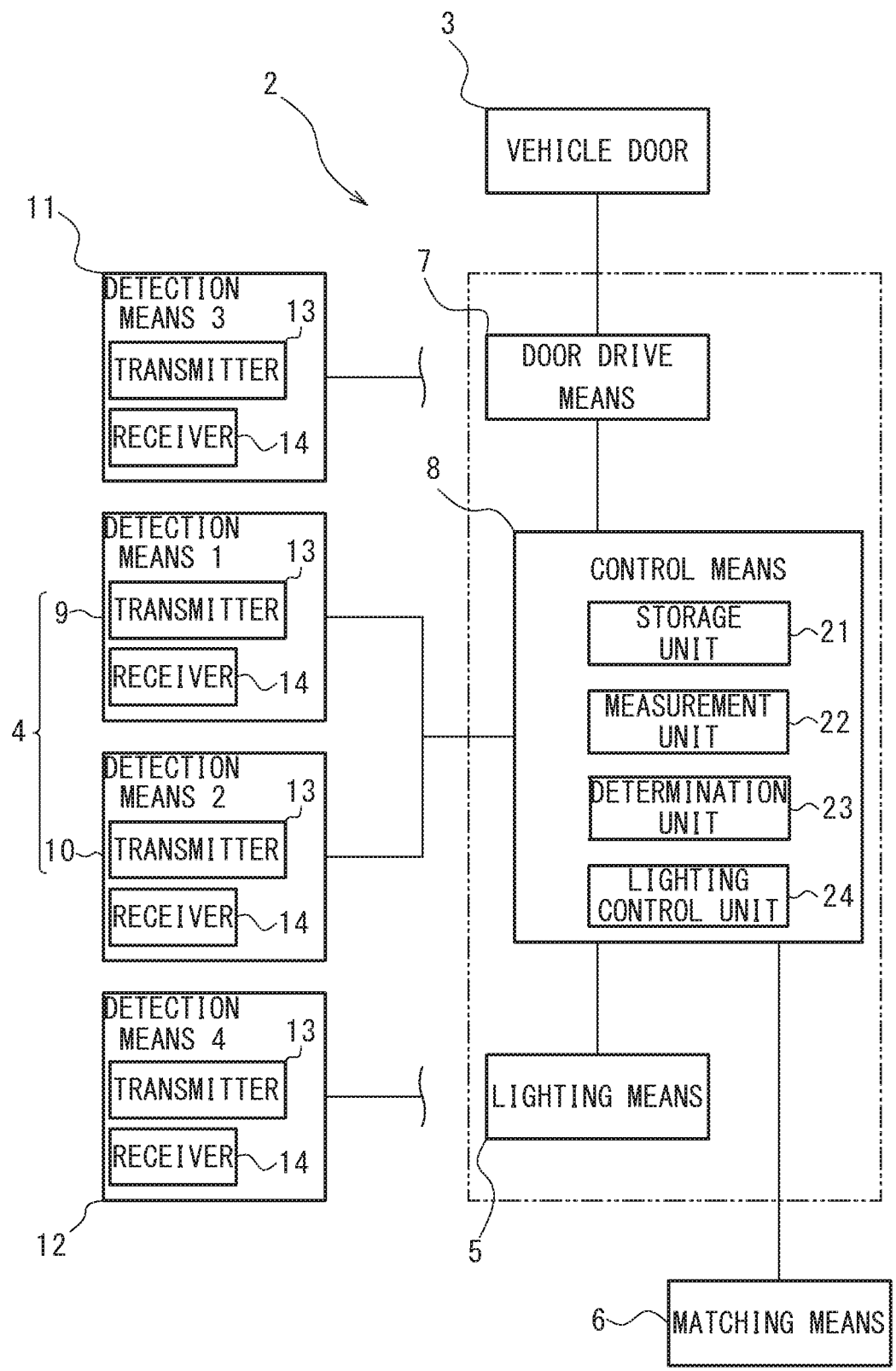
FIG. 2 is a block diagram illustrating a configuration of a door opening/closing device.

As illustrated in FIG. 2, the door opening/closing device 2 includes a detection means 4, a lighting means 5, a matching means 6, a door drive means 7, and a control means 8. It is to be noted that, in FIG. 2, a portion surrounded by a two-dot chain line is a newly added configuration, and existing components are used for the detection means 4 and the matching means 6.

Figure 3:
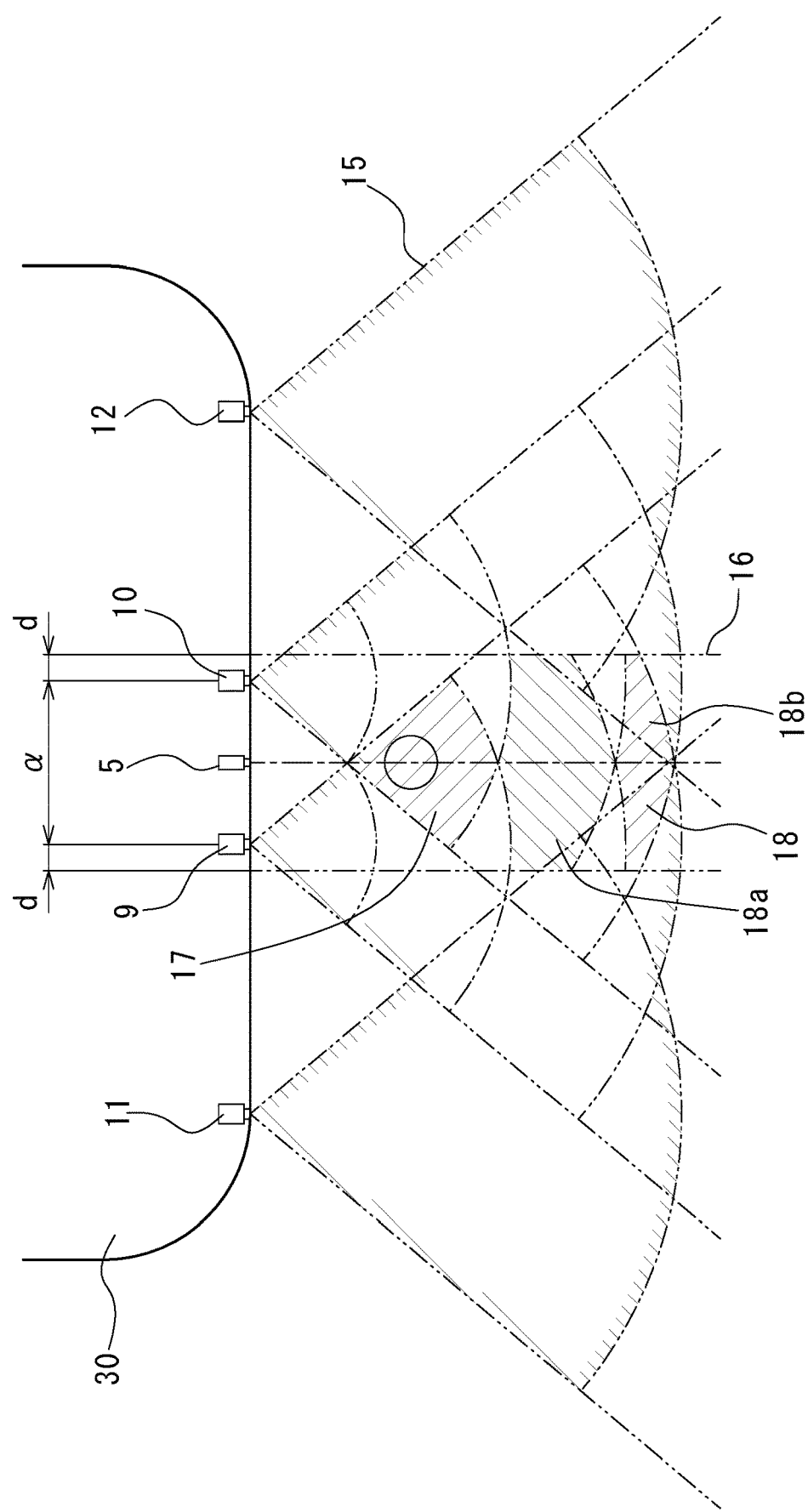
FIG. 3 is a plan view illustrating the relationship between a detection range of the door opening/closing device and a display position.

Referring also to FIG. 3, the detection means 4 is composed of a total of four detection sensors 9 to 12 attached to a rear bumper 30. Here, ultrasonic sensors used as back sonar sensors function as each of detection sensors 9 to 12. The first detection sensor 9 and the second detection sensor 10 are symmetrical with respect to the centerline of the vehicle, and the third detection sensor 11 and the fourth detection sensor 12 are symmetrical with respect to the centerline of the vehicle. Each of the detection sensors 9 to 12 is provided with a transmitter 13 and a receiver 14. Detection ranges extending to the rear side of the vehicle into a cone shape are formed by ultrasonic waves emitted from the transmitters 13. On the ground, each of the detection ranges has a fan shape (having the central angle of about 80 degrees). The reflected waves of the ultrasonic waves transmitted to the detection ranges are received by the receivers 14. The detection result based on the reflected wave from the detection range of each of the detection sensors 9 to 12 is used for determination of the presence or absence of an object to be detected within the detection range and calculation of the position of the object to be detected.

The entire of the ranges detected by the detection sensors 9 to 12 up to a first detection distance (for example, 120 cm) is defined as an approach region 15. The approach region 15 includes following areas detected by both the first detection sensor 9 and the second detection sensor 10. Specifically, the approach region 15 includes a trigger area 17 ranging from a second detection distance (for example, 20 cm) to a third detection distance (for example, 40 cm) and a start area 18 ranging from a fourth detection distance (for example, 50 cm) to the first detection distance. The start area 18 further includes a first start section 18a ranging from the fourth detection distance to a fifth detection distance (for example, 80 cm) and a second start section 18b ranging from the fifth detection distance to the first detection distance. Further, an operation range 16 extending in the width direction across the centerline of the vehicle is set in the approach region 15, the operation range 16 equally extending from the centerline with a predetermined distance. A method for determining the operation range 16 will be described later.

The lighting means 5 is composed of an LED. The LED 5 is mounted on a substrate in a casing attached to the center of the rear bumper 30, which is not illustrated in detail. An opening is formed in the casing, and a lens is provided therein. Light from the LED 5 can be collected by the lens and illuminate the ground at an illuminance by which the user can view the light when it is bright as well as when it is dark around the vehicle 1. The lighting means 5 projects light in the trigger area 17 to form an optical display (operation mark) for guiding the user.

The matching means 6 is provided with a transceiver including an external Low Frequency (LF) antenna for receiving a signal from a key (portable device). The transceiver communicates with the key using an LF signal, and is activated in response to an instruction from a host Electronic Control Unit (ECU) inside the vehicle. As a result, the host ECU performs key authentication.

Although not illustrated, the door drive means 7 is constituted by a motor, a gear mechanism, a damper, etc. which can rotate the door 3 in an opening direction and a closing direction. The door drive means 7 is communicably connected to the control means 8 by a communication cable. The door drive means 7 and the control means 8 may be connected wirelessly.

The control means 8 is composed of a controller including a storage unit 21, a measurement unit 22, a determination unit 23, and a lighting control unit 24. In the present embodiment, one microcomputer is used as the control means 8. However, the measurement unit 22, the determination unit 23, and the lighting control unit 24 may be configured from individual microcomputers.

The storage unit 21 stores, for example, a control program, set data such as thresholds and determination values used in the control program, and a data table used for calculating the distance based on the detection result of the detection sensor.

The measurement unit 22 transmits ultrasonic waves from the transmitters 13 of the detection sensors 9 to 12, and determines the regions where the receivers 14 can receive the reflected waves as a plurality of areas and sections illustrated in FIG. 3. The measurement unit 22 also measures the distance to the object to be detected that is detected by the first detection sensor 9 and the second detection sensor 10. Information relating to the section or area where the object to be detected is positioned, the distance from the first detection sensor 9 and the second detection sensor 10 to the object to be detected, and distance d in the vehicle width direction between the object to be detected and the first detection sensor 9 or the second detection sensor 10 is stored in the storage unit 21.

The determination unit 23 determines an area or section in the approach region 15 in which the user who is the object to be detected is positioned, based on the determination result of the measurement unit 22. The determination unit 23 also determines whether the user is positioned within the set operation range.

The lighting control unit 24 switches the LED 5 among a lighted state, a blinking state, and an unlit state. For example, when determining that the user is positioned within the start area 18, the lighting control unit 24 switches the lighting state of the LED 5 to the blinking state from the unlit state. When determining that the user has moved from the start area 18 to the trigger area 17, the lighting control unit 24 switches the lighting state of the LED 5 to the lighted state from the blinking state. Thus, the lighting control unit 24 guides the user to the trigger area 17.

Next, the door opening/closing operation of the vehicle door opening/closing device 2 configured as described above will be described according to the flowcharts illustrated in FIGS. 4A to 11.

(Main Flow)

Figure 4A:
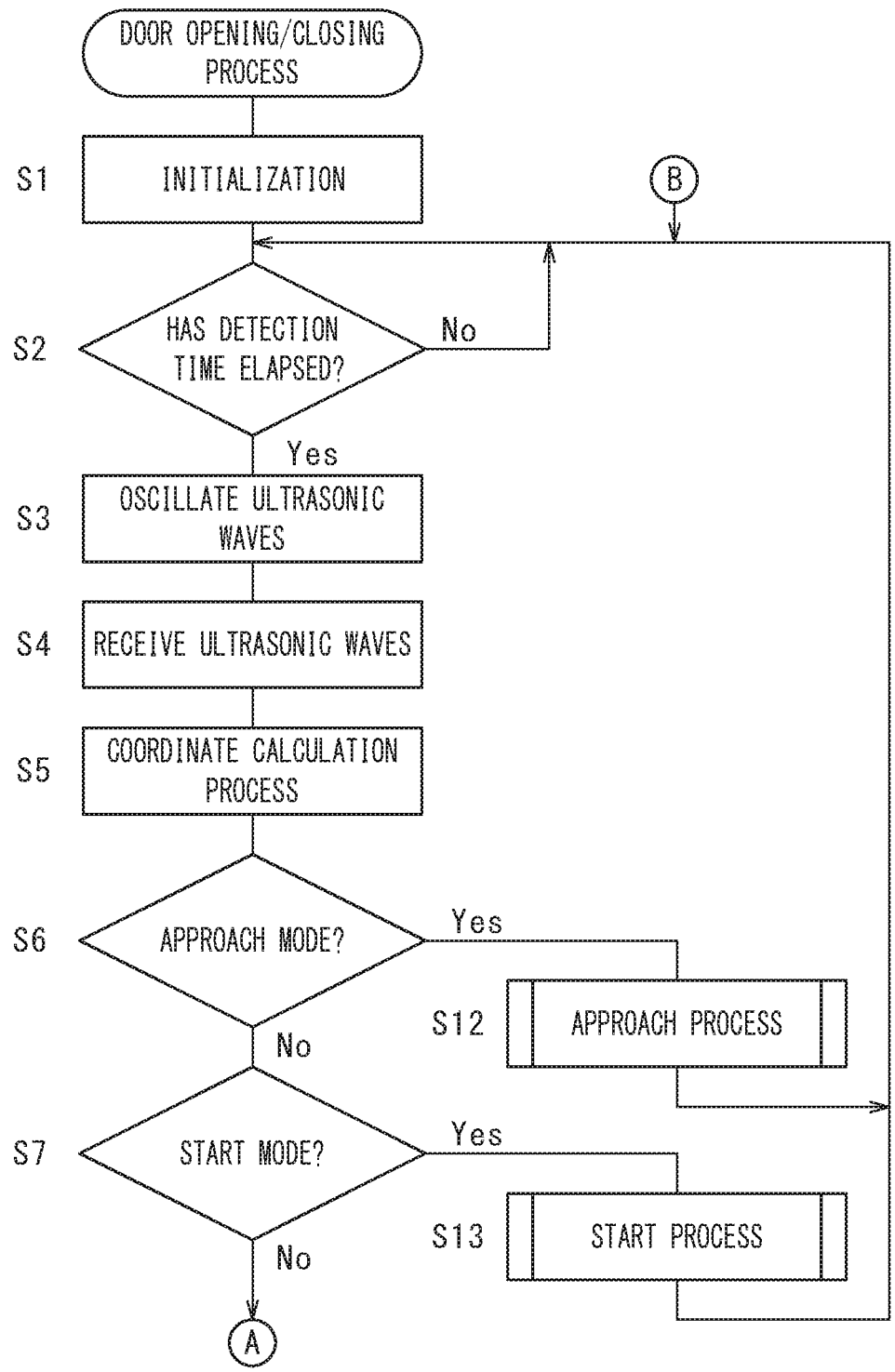
FIG. 4A is a main flowchart illustrating door opening/closing control by a control means.
Figure 4B:
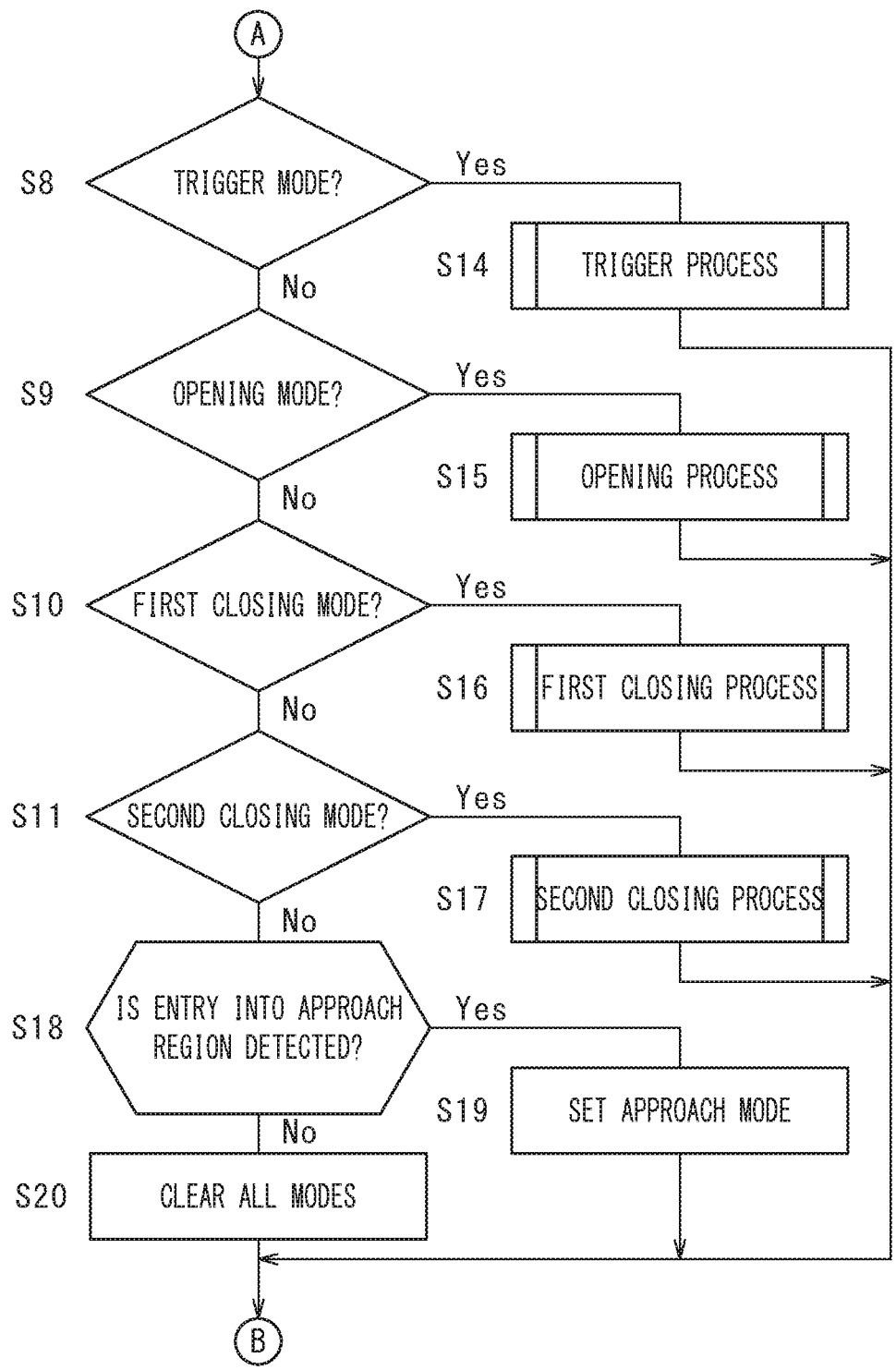
FIG. 4B is a flowchart illustrating the continuation of the flowchart illustrated in FIG. 4A.

As illustrated in FIGS. 4A and 4B, the door opening/closing control includes an approach process (step S12), a start process (step S13), a trigger process (step S14), an opening process (step S15), a first closing process (step S16), and a second closing process (step S17).

Specifically, after initializing each data used in the door opening/closing process (step S1), the control means waits until the detection time elapses (step S2). Here, the detection time is set to 0.025 seconds. When the detection time has elapsed, ultrasonic waves are transmitted from the transmitters 13 of the detection sensors 9 to 12 (step S3), and reflected waves of the ultrasonic waves are received by the receivers 14 (step S4). Then, a coordinate calculation process for calculating the position coordinates of the object to be detected is executed (step S5). Subsequently, it is determined which process is set (steps S6 to S11), and the process corresponding to the set mode is executed (steps S12 to S17). During the execution, when it is determined that a detection distance D to the user detected by any of the detection sensors 9 to 12 is less than a set value (here, set to 120 cm) and is within the approach region 15 (step S18), the processing mode is set to the approach mode (step S19). When none of the modes is set and the user is not within the approach region 15, the modes are all cleared (step S20).

(Coordinate Calculation Process: Step S5)

Figure 5A:
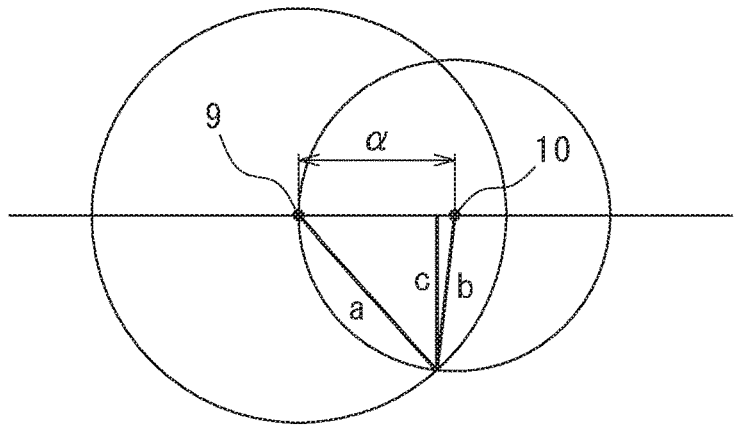
FIG. 5A is a schematic view illustrating a method for detecting an object to be detected that is positioned between a pair of detection sensors.
Figure 5B:
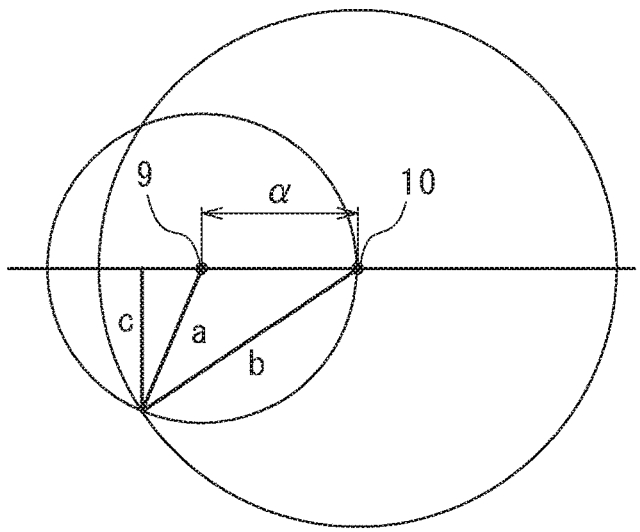
FIG. 5B is a schematic view illustrating a method for detecting an object to be detected that is not positioned between a pair of detection sensors.
Figure 5C:
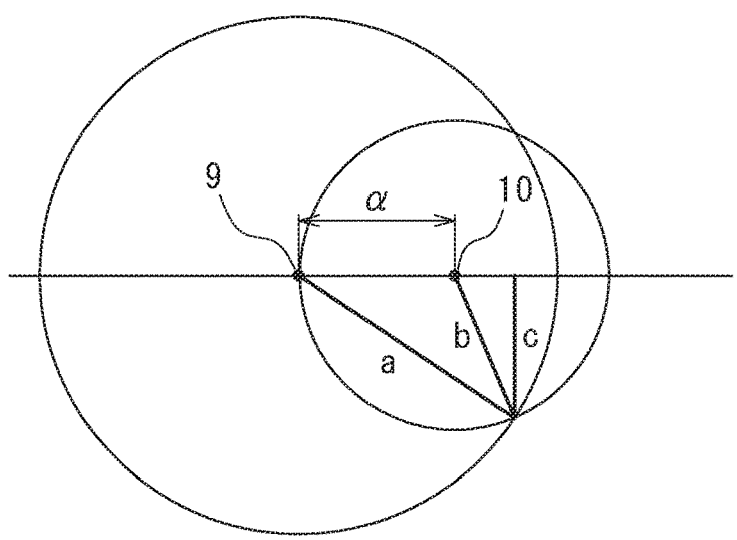
FIG. 5C is a schematic view showing a method for detecting an object to be detected that is not positioned between a pair of detection sensors.

Referring to FIGS. 5A to 5C together with FIG. 3, the operation range is set to outwardly extend in the vehicle width direction beyond parallel lines parallel to the centerline of the vehicle and respectively passing through the first detection sensor 9 and the second detection sensor 10 by a predetermined distance, and this operation range is stored in the storage unit 22. Whether the position (coordinates) of the object to be detected is within the operation range is calculated by the following equation on the basis of distances to the object to be detected that is detected by the first detection sensor 9 and the second detection sensor 10.

[Equation 1]

$$|a^2 - b^2| < 300^2 \quad (1)$$

$$d < 50 \quad (2)$$

In Equation 1, the symbol a is the distance from the first detection sensor 9 to the object to be detected. The symbol b is the distance from the second detection sensor 10 to the object to be detected. The distance $\alpha$ between the detection central axis of the first detection sensor 9 and the detection central axis of the second detection sensor 10 is 300 mm. The symbol d represents the distance set to define ranges extended in the vehicle width direction from the detection central axis of the first detection sensor 9 and the detection central axis of the second detection sensor 10, respectively. Here, the symbol d represents ranges having less than 50 mm outward in the vehicle width direction from the detection central axes of the first detection sensor 9 and the second detection sensor 10. A range including the distance $\alpha$ between the detection sensors 9 and 10 and the distances d is set as the operation range. The distance $\alpha$ (300 mm) between the first detection sensor 9 and the second detection sensor 10 depends on the installment of the ultrasonic sensors used as back sonar sensors, and varies for each vehicle. Therefore, the distance d (50 mm) is not limited to 50 mm, and can be freely set in consideration of the distance $\alpha$.

(Equation 1 (1)) is determined as follows. That is, when the angle made by the straight line connecting the first detection sensor 9 and the second detection sensor 10 and the straight line connecting the first detection sensor 9 and the object to be detected is defined as A, and the angle made by the straight line connecting the first detection sensor 9 and the second detection sensor 10 and the straight line connecting the second detection sensor 10 and the object to be detected is define as B, on the basis of the lengths a, b, and 300 of the sides of the triangle connecting the positions of the first detection sensor 9, the second detection sensor 10, and the object to be detected, the following equation is established by the cosine theorem.

[Equation 2]

$$b^2 = 300^2 + a^2 - 2 \times 300 \times a \cos A \quad (1)$$

$$a^2 = 300^2 + b^2 - 2 \times 300 \times b \cos B \quad (2)$$

If the following equation is satisfied, it is determined that the object to be detected is positioned between the first detection sensor 9 and the second detection sensor 10 in the vehicle width direction.

[Equation 3]

$$a \cos A < 300 \quad (1)$$

$$b \cos B < 300 \quad (2)$$

Therefore, the following equation is obtained by substituting (1) and (2) in (Equation 2) into (1) and (2) in (Equation 3), respectively.

[Equation 4]

$$a^2 - b^2 < 300^2 \quad (1)$$

$$b^2 - a^2 < 300^2 \quad (2)$$

When (Equation 4) is rearranged, (Equation 1(1)) is obtained.

Further, the distance d is obtained by the following equations respectively in the case where the object to be detected is positioned on the left side of the first detection sensor 9 and the case where the object to be detected is positioned on the right side of the second detection sensor 10.

[Equation 5]

$$d = a \cos A - 300 \quad (1)$$

$$d = b \cos B - 300 \quad (2)$$

When (1) and (2) in (Equation 2) are substituted, the following equation is obtained.

$$d = \frac{a^2 - b^2}{600} - 150 \quad \text{[Equation 6]}$$

$$d = \frac{b^2 - a^2}{600} - 150$$

When Equation (6) is rearranged, the following equation is obtained.

$$d = \frac{|a^2 - b^2|}{600} - 150 \quad \text{[Equation 7]}$$

(Equation 7) may only provide the value of less than 50 mm.

If (Equation 1) is satisfied, it is determined that the object to be detected is positioned within the operation range 16. As a result, the coordinate d in the width (x axis) direction of the object to be detected is determined, and during this process, the coordinate c in the direction of linear distance (y axis) direction from the vehicle can be determined by the cosine theorem (Equation 8), and thus, the position of the object to be detected can be accurately detected as coordinates. The coordinate position of the object to be detected is detected as described above, whereby the operation range of the trigger area 17 and the start area 18 described later can be limited. If these areas are determined only by the detection distances of the first detection sensor 9 and the second detection sensor 10, the detection range becomes too wide, which may cause a malfunction. In view of this, the operation range 16 is set without depending only on the detection distances of the first detection sensor 9 and the second detection sensor 10 by accurately detecting the coordinate position of the object to be detected. In the present embodiment, the coordinate c in the direction of linear distance (y axis) direction is not used, but the linear distance of the object to be detected may be detected using the coordinate c.

(1) The case where a part to be detected is potential between the sensors [Equation 8]

$$c = (b^2 - d^2)^{1/2}$$

$$d = \frac{|a^2 - b^2|}{600} - 150$$

(2) The case where the part to be detected is positioned outside a space between the sensors (on the sensor 11 side)

$$c = (b^2 - d^2)^{1/2}$$

$$d = \frac{|a^2 - b^2|}{600} - 150$$

(3) The case where the part to be detected is positioned outside the space the sensors (on the sensor 12 side)

$$c = (b^2 - d^2)^{1/2}$$

$$d = \frac{|a^2 - b^2|}{600} - 150$$

(Approach Process: Step S12)

Figure 6:
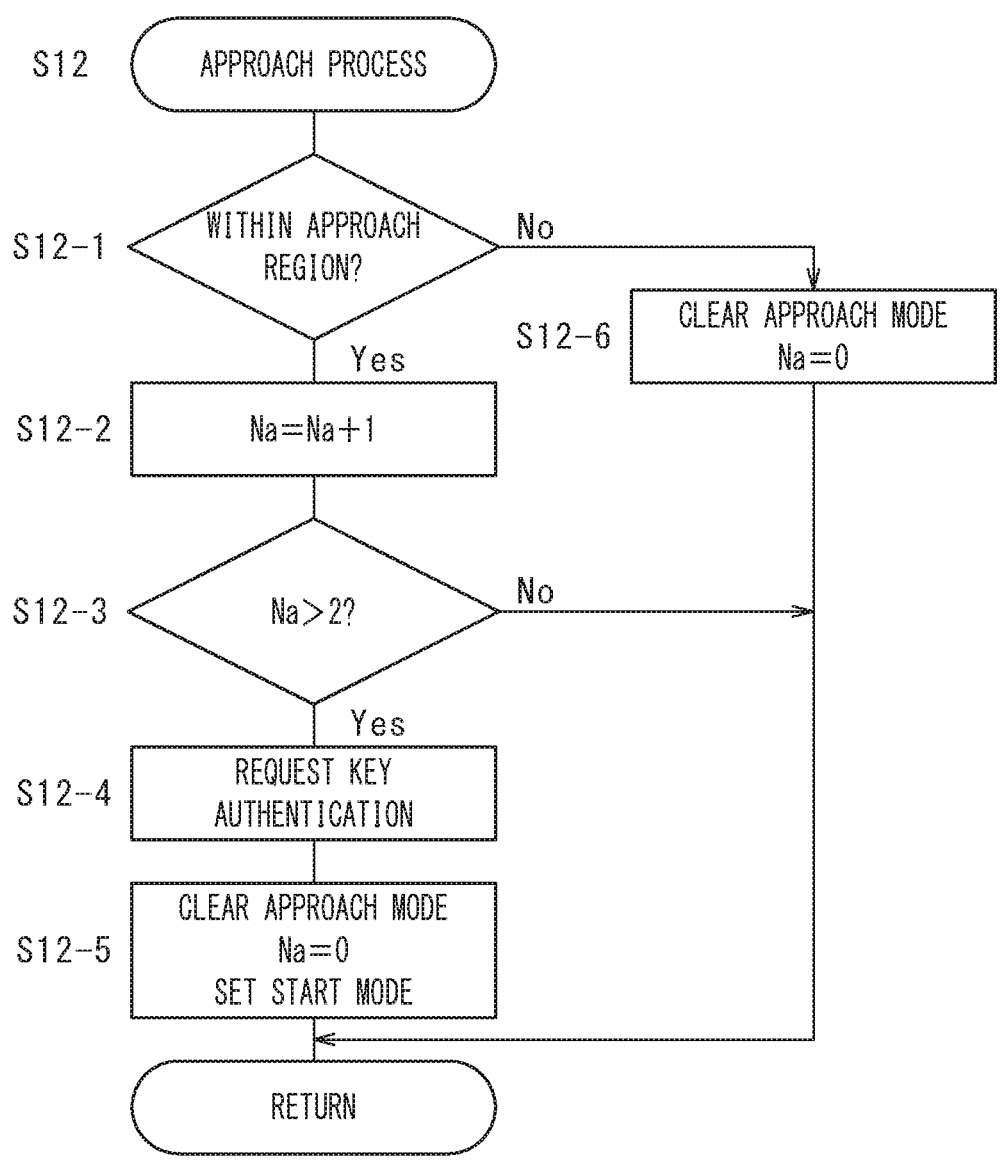
FIG. 6 is a flowchart illustrating an approach process in FIG. 4A.

In step S19, if the approach mode is set, the approach process illustrated in FIG. 6 is executed. In the approach process, it is determined whether the user who is the object to be detected is positioned within the approach region 15 detected by the detection sensors 9 to 12 (step S12-1). If a detection signal is issued from any one of the detection sensors 9 to 12, it is determined that the user is positioned within the approach region 15.

If the user is positioned within the approach region 15 (step S12-1: YES), a counter Na is incremented by 1 (step S12-2), and the process waits until the counter Na exceeds 2. Then, if it is determined that the user is positioned within the approach region 15 for a predetermined time (step S12-3: YES), key authentication is requested (step S12-4). In key authentication, the matching means 6 requests the key to transmit an authentication code, and compares the authentication code received from the key with a registered regular code. If the authentication code matches the regular code, it is determined that the user is authenticated, and then, the approach mode is cleared, and the start mode is set (step S12-5). That is, the processing mode is changed from the approach mode to the start mode.

If the user is not positioned within the approach region 15 or if the user moves out of the approach region 15 within a predetermined time (step S12-1: NO), the approach mode is cleared (step S12-6).

As described above, in the approach process, key authentication is performed when the user is positioned within the wide approach region 15 set in advance. Thus, when the user automatically opens or closes the door 3, the key authentication process can be completed in advance before a specific operation described later is executed. In addition, authentication is performed only when the user is continuously positioned within the approach region 15 for a predetermined time, and authentication is not performed for a person who is temporarily positioned within the approach region 15, such as a passerby. Thus, power consumption can be reduced.

(Start Process: Step S13)

Figure 7:
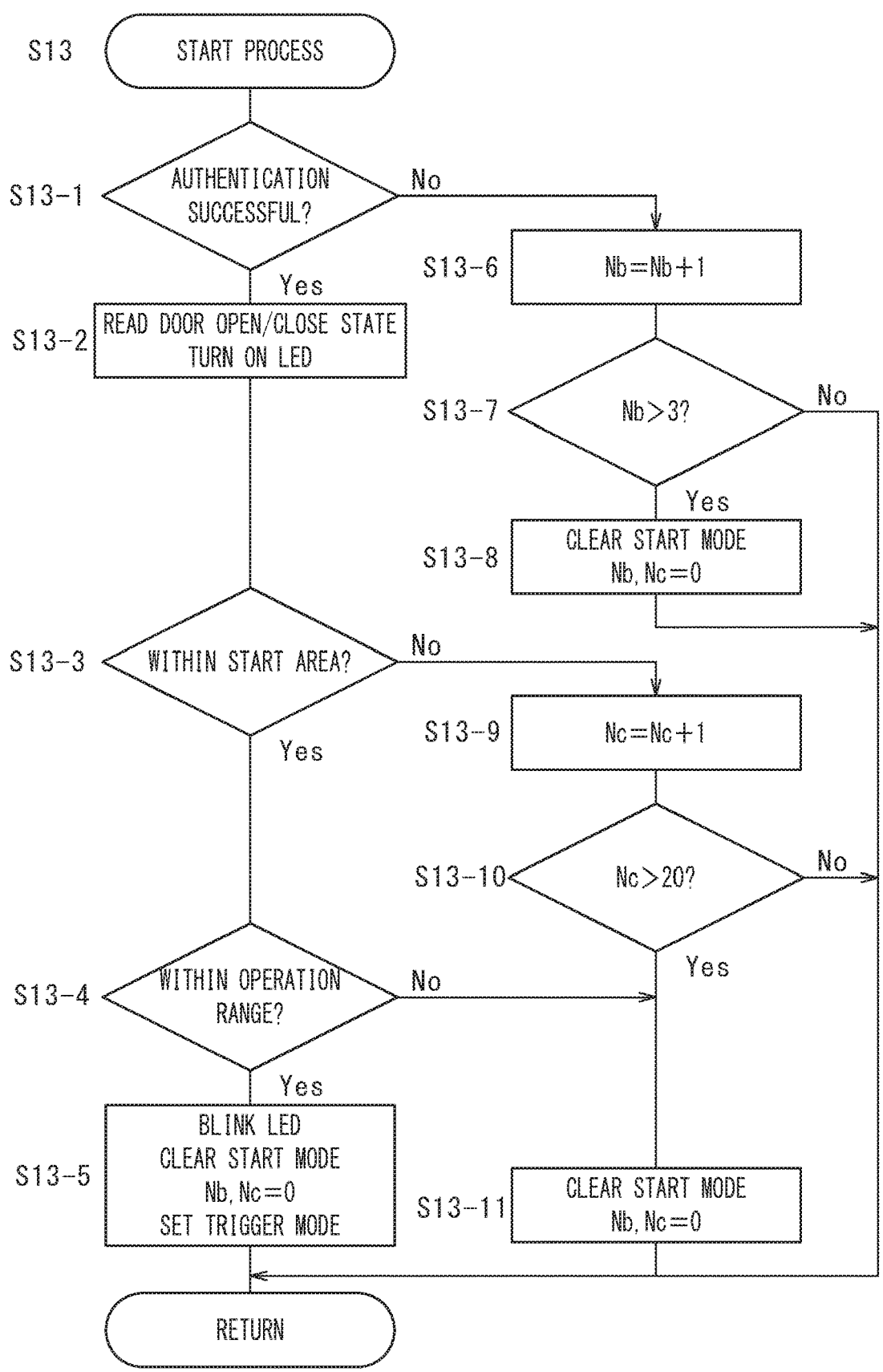
FIG. 7 is a flowchart illustrating a first approach process in FIG. 4A.

If the start mode is set in the approach process, the start process illustrated in FIG. 7 is started. In the start process, it is determined whether the key authentication is properly performed in the approach process (step S13-1). If the authentication is properly performed, the open/close state of the door 3 (whether the door 3 is in the open position or the closed position) is read (step S13-2). At this time, the LED 5 is turned on.

Then, it is determined whether the user is positioned within the start area 18 on the basis of the detection signal from the first detection sensor 9 or the second detection sensor 10 (step S13-3). As described above, the start area 18 is within the range determined by the detection distances of the first detection sensor 9 and the second detection sensor 10.

If the user is positioned within the start area 18, it is further determined whether the position of the user is within the operation range 16 (step S13-4). That is, it is determined whether the user is positioned within the operation range 16 satisfying (Equation 1) described above. As a result, the range of the start area 18 is further limited in the vehicle width direction to narrow the detection range, whereby the position of the user can be accurately identified.

If the user is positioned within the operation range 16 in the start area 18, the LED 5 is caused to blink, the start mode is cleared, and a trigger mode is set (step S13-5).

If it is determined that smart entry authentication is not properly performed (step S13-1: No), a counter Nb is incremented by 1 (step S13-6). If the smart entry authentication is not performed before the counter Nb exceeds 3, (step S13-7), the start mode is cleared (step S13-8).

If it is determined that the user is not positioned within the start area 18 (step S13-3: No), a counter Nc is incremented by 1 (step S13-9). If the user is not positioned within the start area 18 before the counter Nc exceeds 20 (step S13-10), the start mode is cleared (step S13-11). When it is determined that the user is not positioned within the operation range 16 (step S13-4: No), the start mode is also cleared (step S13-11).

Thus, in the start process, whether the user is allowed to start the door opening/closing operation is determined based on whether the user stops within the start area 18 and within the operation range limited in the vehicle width direction. Therefore, the range in which the user should be positioned can be limited, and transition to the trigger process can be reliably achieved. Further, the LED 5 is caused to blink, which can prompt the user to move and make the user instantly find the place he/she should move.

(Trigger Process: Step S14)

Figure 8:
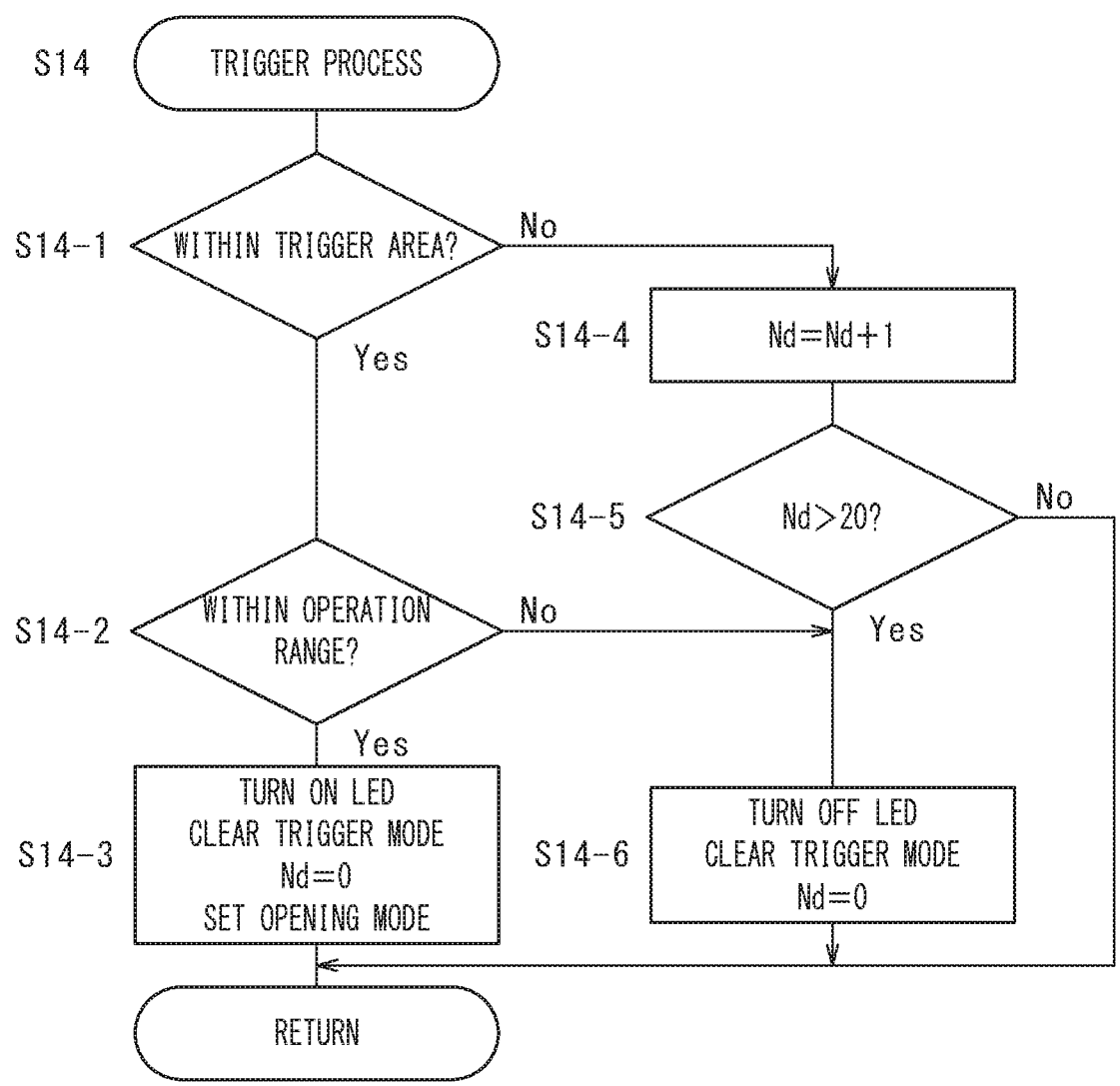
FIG. 8 is a flowchart illustrating a second approach process in FIG. 4B.

If the trigger mode is set in the start process, the trigger process illustrated in FIG. 8 is started. In the trigger process, it is determined whether the user has moved from the operation range 16 in the start area 18 into the trigger area 17 on the basis of the detection results of the first detection sensor 9 and the second detection sensor 10 (step S14-1). If the user has moved into the trigger area 17, it is further determined whether the position of the user is within the operation range 16 (step S14-2). The trigger area is narrower than the operation range 16, and the position of the user can be accurately detected using the coordinates calculated as described above. Then, when the user is within the operation range 16, the LED 5 is switched from the blinking state to the lighted state, and the processing mode is changed from the trigger mode to an open mode (step S14-3).

If the user has not moved into the trigger area 17 (step S14-1: No), a counter Nd is incremented by 1 (step S14-4). If the user does not move into the trigger area 17 before the counter Nd exceeds 20 (step S14-5), the LED 5 is turned off and the trigger mode is cleared (step S14-6).

Thus, in the trigger process, the user can visually recognize that the movement from the operation range 16 within the start area 18 to the trigger area 17 is completed by the LED 5 being changed from the blinking state to the lighted state.

As described above, after the steps from the approach process to the trigger process are completed, an opening process for automatically opening the door 3 is executed if the door 3 is closed, and a closing process (first closing process and second closing process) for automatically closing the door 3 is executed when the door 3 is opened, in the manner described below.

(Opening Process: Step S15)

Figure 9:
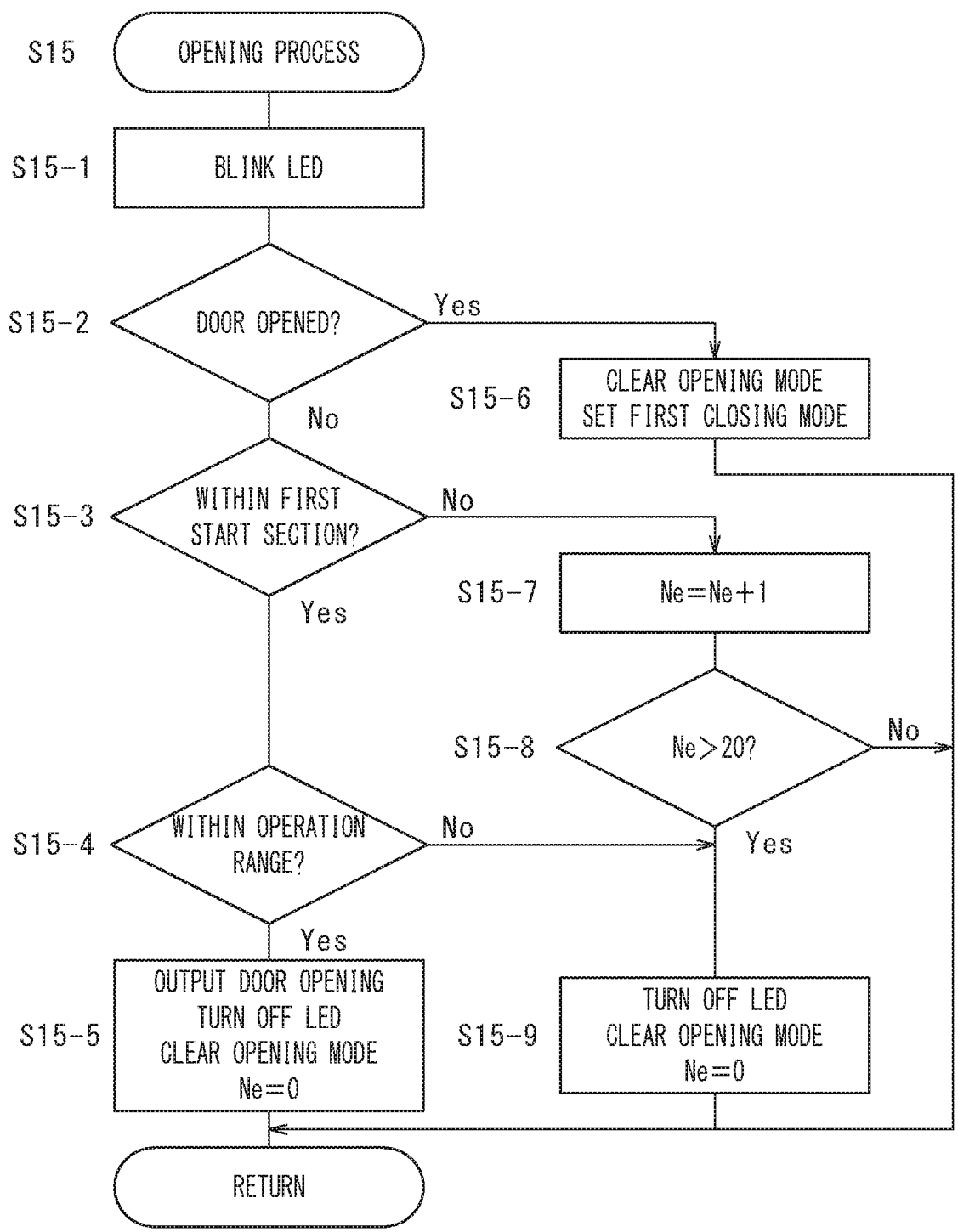
FIG. 9 is a flowchart illustrating an opening process in FIG. 4B.

If the open mode is set in the trigger process, the opening process illustrated in FIG. 9 is started. In the opening process, the LED 5 is caused to blink (step S15-1) to prompt the user to move to the start area 18.

Subsequently, it is determined whether the door 3 is opened (step S15-2). If the door 3 is closed, it is determined whether the user has moved to the first start section 18a of the start area. 18 (step S15-3). If the user has moved into the first start section 18a, it is further determined whether the position of the user is within the operation range 16 (step S15-4). That is, it is determined whether the user is positioned within the operation range 16 satisfying (Equation 1) described above. As a result, the range of the first start section 18a is further limited in the vehicle width direction to narrow the detection range, whereby the position of the user can be accurately identified. When the user is within the operation range 16, the driving of the door drive means 7 is controlled to output a door opening for opening the door 3, turn off the LED 5, and clear the open mode (step S15-5).

As described above, in the opening process, the user who has moved to the trigger area 17 is prompted to move into the first start section 18a by light emitted from the LED 5 to the ground in a blinking manner. After the user moves to the first start section 18a and the safety is confirmed, the door 3 is opened. Therefore, the door 3 can be opened automatically, smoothly, and safely.

If the door 3 is opened (step S15-2: Yes), the processing mode is changed from the opening mode to the first closing mode (step S15-6).

If the user has not moved into the first start section 18a (step S15-3: No), a counter Ne is incremented by 1 (step S15-7). If the user does not move into the start area 18 before the counter Ne exceeds 20 (step S15-8), the LED 5 is turned off and the opening mode is cleared (step S15-9).

(First Closing Process: Step S16)

Figure 10:
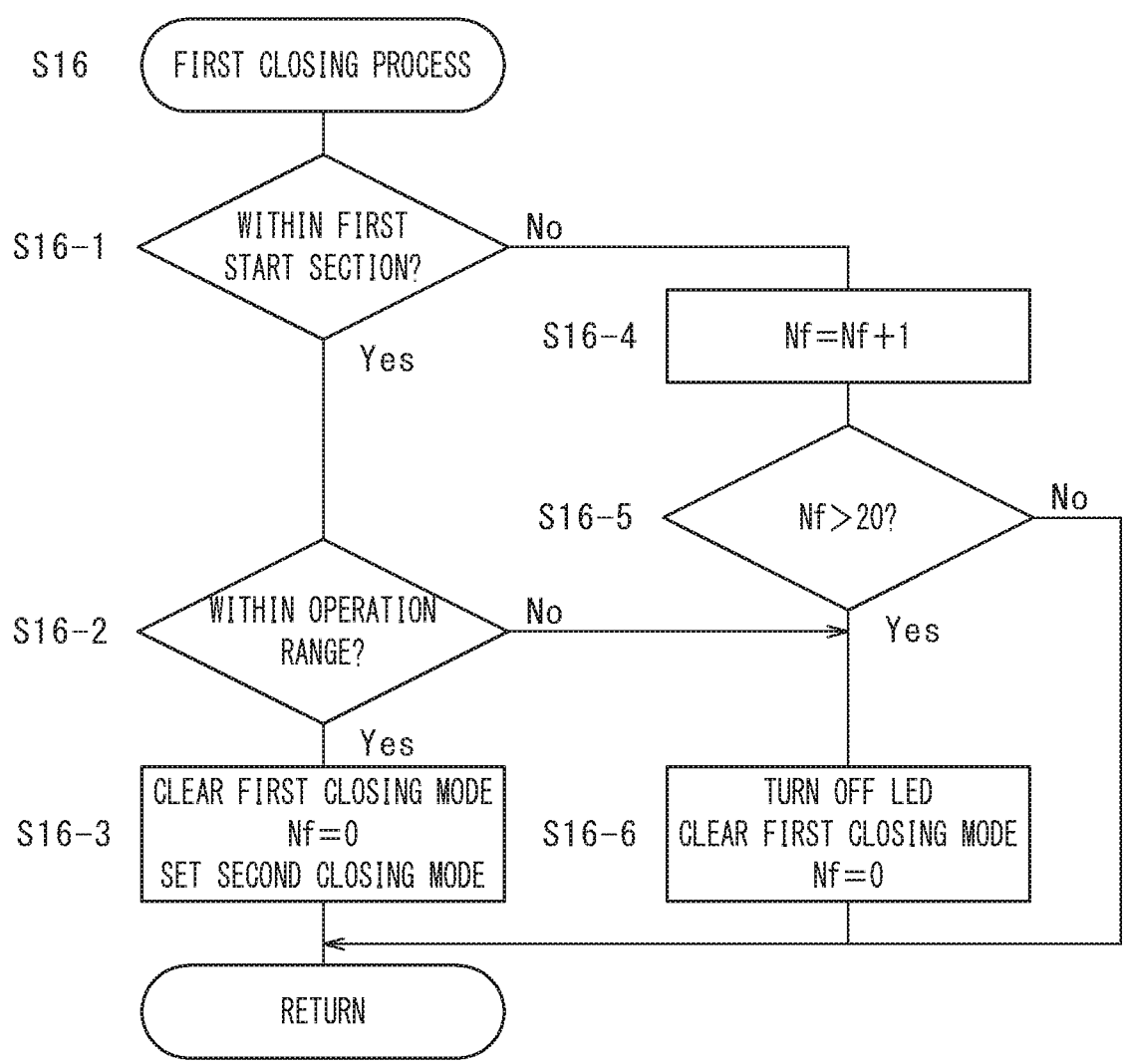
FIG. 10 is a flowchart illustrating a first closing process in FIG. 4B.

If the door 3 is opened and the processing mode is set to the first closing mode in the opening process, the first closing process illustrated in FIG. 10 is started. In the first closing process, it is determined whether the user is positioned within the first start section 18a (step S16-1). At this point of time, the LED 5 is caused to blink in the opening process, and thus, the user can find that he/she may move into the first start section 18a. Then, if the user is positioned within the first start section 18a (step S16-1: YES), it is further determined whether the position of the user is within the operation range 16 (step S16-2). That is, it is determined whether the user is positioned within the operation range 16 satisfying (Equation 1) described above. As a result, the range of the first start section 18a is further limited in the vehicle width direction to narrow the detection range, whereby the position of the user can be accurately identified. Then, when the user is within the operation range 16, the processing mode is changed from the first closing mode to the second closing mode (step S16-3).

If the user has not moved into the first start section 18a (step S16-1: No), a counter Nf is incremented by 1 (step S16-4). If the user does not move into the first start section 18a before the counter exceeds 20 (step S36-5), the first closing mode is cleared and the LED 5 is turned off (step S16-6).

(Second Closing Process: Step S17)

Figure 11:
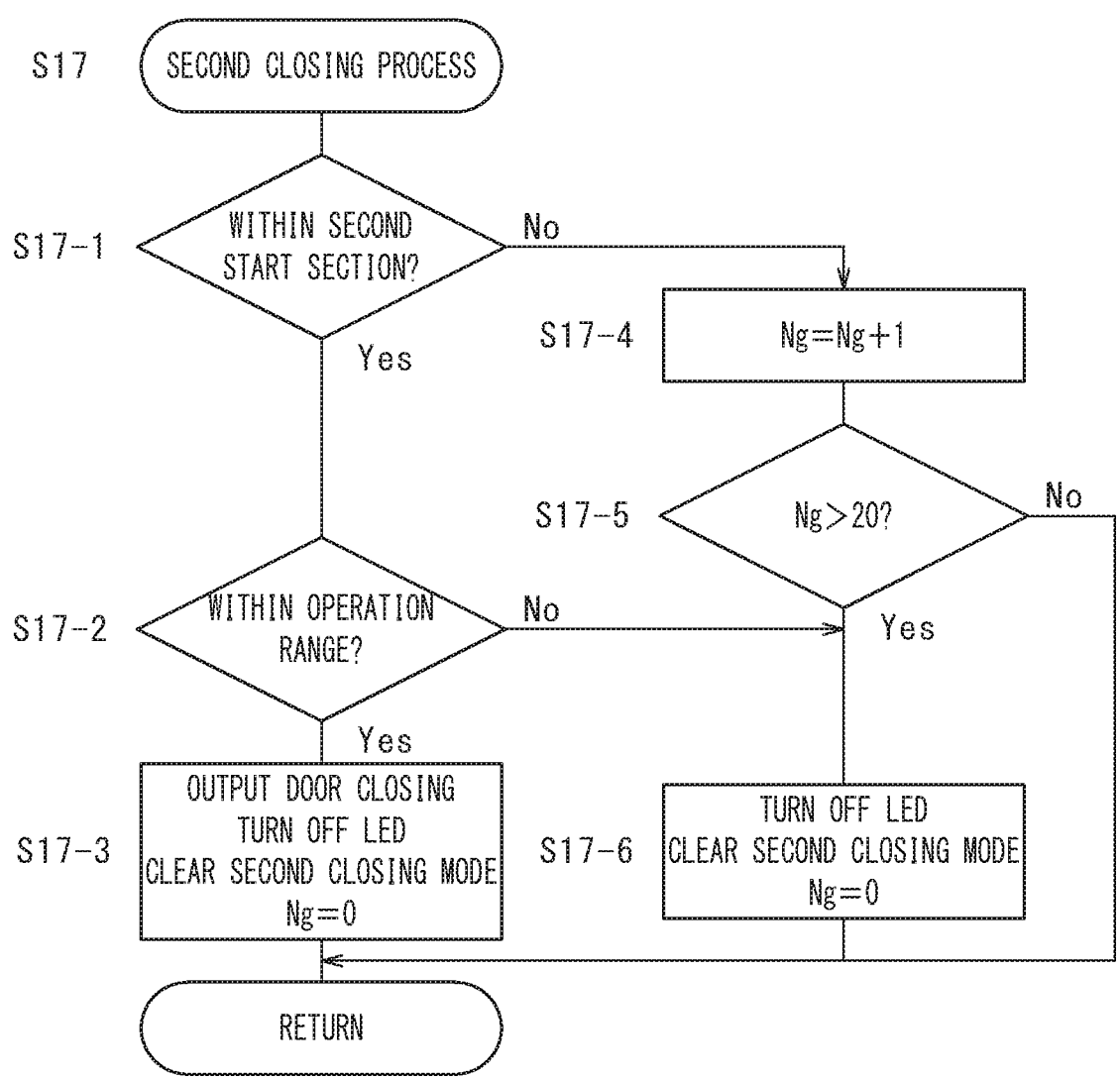
FIG. 11 is a flowchart illustrating a second closing process in FIG. 4B.

If the first closing mode is set in the first closing process, the second closing process illustrated in FIG. 11 is started. In the second closing process, it is determined whether the user has moved from the first start section 18a to the second start section 18b (step S17-1). If the user has moved into the second start section 18b, it is further determined whether the position of the user is within the operation range 16 (step S17-2). That is, it is determined whether the user is positioned within the operation range 16 satisfying (Equation 1) described above. As a result, the range of the second start section 18b is further limited in the vehicle width direction to narrow the detection range, whereby the position of the user can be accurately identified. When the user is within the operation range 16, a door closing output signal is transmitted to the door drive means 7 to cause the door drive means 7 to close the door 3. Further, the LED 5 is turned off, and the second closing mode is cleared (step S17-3).

If the user has not moved into the second start section 18b (step S17-1: No), a counter is incremented by 1 (step S17-4). If the user does not move from the first start section 18a to the second start section 18b before the counter exceeds 20 (step S17-5), the second closing mode is cleared and the LED 5 is turned off (step S17-6).

Thus, in the first closing process and the second closing process, the door 3 is automatically closed after the user moves to the second start section 18b from the first start section 18a. Therefore, the user can close the door 3 safely with simple operation without being caught by the door 3.

It should be noted that the present invention is not limited to the configuration described in the above embodiment, and various modifications are possible.

In the embodiment described above, the hatchback door is described as the door 3. However, the present invention is not limited thereto, and the door 3 may be a hinged door or a sliding door for boarding.

In the above embodiment, the door is controlled to be opened and closed based on detection signals from the existing four sonar sensors. However, the door may be controlled by three or more than four sonar sensors.

DESCRIPTION OF SYMBOLS

1 Vehicle
2 Door opening/closing device
3 Door

4 First detection means
6 Matching means
7 Door drive means
8 Control means
9 First detection sensor
10 Second detection sensor
11 Third detection sensor
12 Fourth detection sensor
13 Transmitter
14 Receiver
15 Approach region
16 Operation range
17 Trigger area
18 Start area
18a First start section
18b Second start section
21 Storage unit
22 Measurement unit
23 Determination unit
30 Rear bumper

The invention claimed is:

1. A device for opening and closing a door of a vehicle, the device comprising:
a motorized gear mechanism that opens and closes the door of the vehicle;
a first back sonar sensor and a second back sonar sensor each forming a detection range outside the vehicle and detecting a distance to an object to be detected that is positioned within the detection range, each of the first and second back sonar sensors including adjacent ultrasonic sensors; and
a microcomputer that controls driving of the motorized gear mechanism for opening or closing the door based on detection results of the first and second back sonar sensors,
wherein the detection ranges of the first and second back sonar sensors are arranged in a vehicle width direction and partially overlapped with each other, and
the microcomputer is configured to:
set an operation range having a predetermined width in the vehicle width direction and defined in the two detection ranges by a pair of lines that extend in a vehicle longitudinal direction on both outer sides of the first and second back sonar sensors in the vehicle width direction;
set a start area and a trigger area within the operation range, the trigger area nearer to the vehicle than the start area, wherein the two detection ranges are overlapped within each of the start area and the trigger area; and
prepare for opening or closing of the door by the motorized gear mechanism, when the first and second back sonar sensors detect that the object to be detected has moved from the start area to the trigger area.

2. The device according to claim 1, wherein the microcomputer starts an operation for opening or closing the door by the motorized gear mechanism when the first and second back sonar sensors detect that the object to be detected has moved from the trigger area to the start area.

3. The device according to claim 2, wherein the microcomputer starts an operation for opening the door by the motorized gear mechanism when the door is in a closed position.

4. The device according to claim 3, wherein the microcomputer calculates coordinates of the object to be detected based on lengths of respective sides of a triangular shape connecting the first back sonar sensor, the second back sonar sensor, and the object to be detected, and detects the position of the object to be detected.

5. The device according to claim 2, wherein the microcomputer starts an operation for closing the door by the motorized gear mechanism when the door is in an open position and the first and second back sonar sensors detect that the object to be detected has moved from a first start section to a second start section which is farther than the first start section in the start area.

6. The device according to claim 5, wherein the microcomputer calculates coordinates of the object to be detected based on lengths of respective sides of a triangular shape connecting the first back sonar sensor, the second back sonar sensor, and the object to be detected, and detects the position of the object to be detected.

7. The device according to claim 2, wherein the microcomputer calculates coordinates of the object to be detected based on lengths of respective sides of a triangular shape connecting the first back sonar sensor, the second back sonar sensor, and the object to be detected, and detects the position of the object to be detected.

8. The device according to claim 1, wherein the microcomputer calculates coordinates of the object to be detected based on lengths of respective sides of a triangular shape connecting the first back sonar sensor, the second back sonar sensor, and the object to be detected, and detects the position of the object to be detected.

* * * * *